United States Patent Office 3,576,771
Patented Apr. 27, 1971

3,576,771
SELF-EXTINGUISHING POLYMER COMPOSITIONS CONTAINING BROMINATED ARYLIDENE KETONES
Hilda Howell and Walter M. Kutz, Pittsburgh, Pa., assignors to Koppers Company, Inc.
No Drawing. Filed May 14, 1968, Ser. No. 728,882
Int. Cl. C08f 47/10; C09k 3/28
U.S. Cl. 260—2.5
10 Claims

ABSTRACT OF THE DISCLOSURE

Solid organic polymers normally susceptible to burning are rendered self-extinguishing by incorporating therein a brominated arylidene ketone such as a brominated benzilidene or cinnamilidene ketone; for example, 1,5-diphenyl-1,2,4,5-tetrabromo-3 - pentanone. The self-extinguishing agents useful in the invention are unexpectedly stable to hydrolysis, yet are highly reactive as self-extinguishing agents.

BACKGROUND OF THE INVENTION

Synthetic polymers are in wide use today for a variety of applications. For many of these applications, polymers which are normally flammable must be rendered self-extinguishing for safety purposes. For example, polymer foams such as foam polystyrene are light in weight, have excellent heat insulating properties, and are useful in building construction; but, unfortunately, such foams are highly flammable and susceptible to rapid flame-spread. Because of the fire hazard inherent in its use, it is essential in order to meet safety standards that the foam be rendered fire retardant. In the past, certain brominated organic compounds have been utilized for rendering self-extinguishing solid polymer compositions such as the expandable polystyrene foams mentioned above. While many compounds have been found to be effective to render a polymer composition self-extinguishing, when they are used in amounts sufficient to achieve the desired degree of fire retardancy, the properties of the polymers into which they are incorporated have been adversely affected. Also, many of the prior art self-extinguishing compounds tend to be unstable; and, when incorporated into the polymer, tend to deteriorate over a period of time and lose their self-extinguishing efficiency.

It is, therefore, desirable to find brominated, organic compounds which do not suffer from the above disadvantages in that they can be incorporated into polymers in amounts sufficient to lend self-extinguishing characteristics to the polymer without harming its molding properties, and which have sufficient stability such that their effectiveness is not lost with the passage of time. According to the invention, it has been found that a class of compounds with these desirable properties are the brominated arylidene ketones such as brominated benzilidene and cinnamilidene ketones.

SUMMARY OF THE INVENTION

Solid organic polymer compositions normally susceptible to burning are rendered self-extinguishing by incorporating therein from about 0.1–15% by weight, based on polymer, of a brominated arylidene ketone such as a brominated benzilidene or cinnamilidene ketone. Solid polymer compositions rendered self-extinguishing according to the invention include poly(alpha-olefins), poly(vinylaromatics), poly(conjugated diolefins), and copolymers thereof.

DETAILED DESCRIPTION

The compounds useful in the invention are brominated arylidene ketones having the general formula:

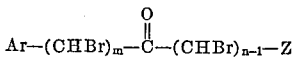

wherein Ar is phenyl, naphthyl, or tetralyl; Z is phenyl, alkyl having 4–20 carbon atoms, naphthyl or tetralyl; $m$ has a value of 2–4; and $n$ has a value of 1–5.

The brominated arylidene ketones useful in accordance with the invention are, in general, comprised of a first aromatic radical connected through the group:

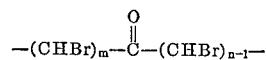

wherein $m$ and $n$ are as defined above, to a second aromatic radical or an alkyl radical. Both the first and second aromatic radicals are selected from phenyl, naphthyl, and tetralyl and may be themselves further substituted, e.g. with alkyl, halogen, etc. The alkyl radical may be, for example, tertiary-butyl, 1,1-dimethyl-butyl, 1,1-dimethylhexyl, etc.

The arylidene ketones useful in the invention are prepared by a two-step process in which a parent olefin is first prepared in a conventional manner by condensing an aldehyde with a ketone in a basic aqueous alcohol solution. The resulting olefin, an unsaturated ketone, is then brominated by adding bromine at low temperatures to a solution of the olefin in a solvent such as carbon tetrachloride or chloroform. Suitable aldehydes are, for example, benzaldehyde, naphthaldehyde, tolualdehyde, xylylaldehyde, and cinnamaldehyde. Suitable ketones include, pinacolone, (t-butylmethylketone), acetophenone (methylphenylketone), acetomesitylene, acetotetralin, 3,3-dimethyl-pentanone-2, and so forth.

Following is a list of compounds found to be effective in rendering self-extinguishing solid organic polymers normally susceptible to burning according to the invention.

Compound Structure

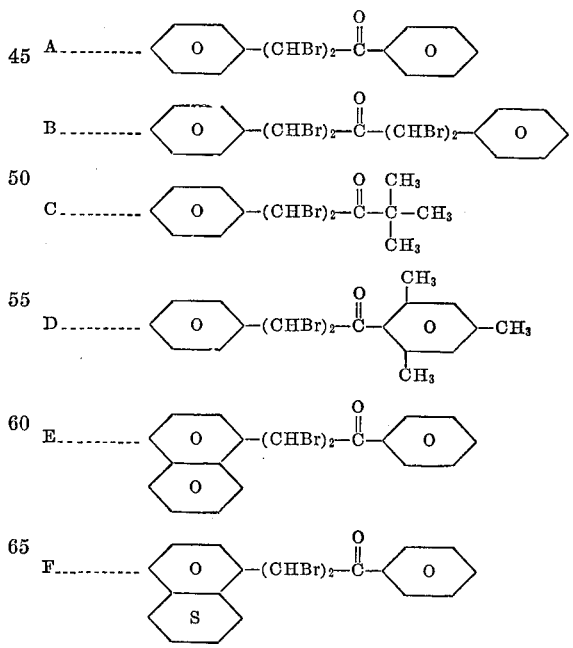

| Compound | Structure |
|---|---|

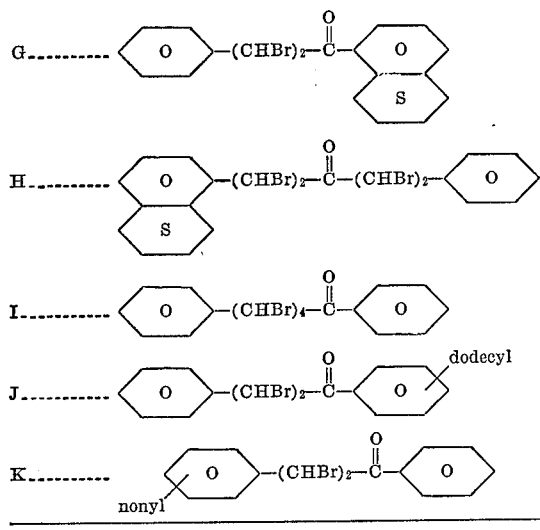

Certain incidental changes may be made in the structures of the brominated arylidene ketones useful in the invention. For example, the aryl-portion of the compounds may be further substituted, e.g. with long chain alkyl groups to decrease their vapor pressure or to increase their solubility in the polymer being rendered fire-retardant as in compounds J and K in the above list. In a like manner, any of the compounds in the above list may be incidentally substituted with alkyl, halogen, etc.

Self-extinguishing, organic polymer compositions are prepared according to the invention by incorporating the brominated arylidene ketones of the invention into solid organic polymers normally susceptible to burning such as polyalphaolefins, polyvinylaromatics poly(conjugated diolefins), and copolymers thereof. Polyalphaolefins which may be rendered self-extinguishing according to the invention include, e.g. polyethylene, polypropylene, poly(pentene-1), poly(butene-1), etc., and copolymers thereof. Polyvinylaromatics which may be rendered self-extinguishing according to the invention include polystyrene, poly(divinylbenzene), poly(α-methylstyrene), poly(nuclear methylstyrene), poly(chlorostyrene), and copolymers thereof, e.g. styrene-acrylonitrile, styrene-butadiene, and styrene-maleic acid copolymers. Poly(conjugated diolefins) which may be rendered self-extinguishing according to the invention include, e.g. poly(1,4-butadiene) and copolymers thereof, e.g. copolymers of butadiene with styrene.

The brominated ketones of the invention also lend self-extinguishing properties to alkyd resins, i.e. condensation polymers formed by polyesterifying dihydric alcohols with dicarboxylic acids or anhydrides.

While effective in both foamed and non-foamed polymer, the self-extinguishing agents of the invention have been found to be particularly advantageous for use with polymer foams derived from vinyl aryl polymers such as polystyrene. A convenient form of polystyrene for molding into foamed articles is polystyrene beads prepared in aqueous suspension by a process such as described, for example, in U.S. Patent No. 2,907,756 wherein a vinyl aryl amonomer is polymerized in aqueous suspension in the presence of an initiator system of t-butyl perbenzoate and benzoyl peroxide at a fixed time-temperature cycle using suspending agents to maintain the monomers suspended in the aqueous medium in the form of particles or beads.

The polymer particles prepared by suspension polymerization are rendered expandable by incorporating a blowing agent to the particles either during or after the polymerization. Processes for such incorporation are described in Patent No. 3,192,169 and Patent No. 2,983,692.

Preferred blowing agents include volatile aliphatic hydrocarbons containing from 1–7 carbon atoms of the molecule, i.e. ethane, methane, propane, butane, pentane, isopentane, hexane, heptane, cyclohexane, and their halogenated derivatives which boil at a temperature below the softening point of the polymer. Usually from about 3–20% by weight of the polymer of the blowing agent is incorporated therein.

In the case where a self-extinguishing agent is to be incorporated into a suspension-prepared polymer, it is desirable to incorporate the agent into the polymer beads while the beads are suspended in the aqueous suspension system. However, the incorporation of bromine containing self-extinguishing agents into polymer beads in aqueous suspension involves an additional problem in that a suitable self-extinguishing agent for use in such a process must be hydrolytically stable so as to not lose bromine via hydrolysis in the aqueous suspension. In fact, a large loss of bromine by hydrolysis can introduce sufficient HBr into the suspension to cause suspension failure. Surprisingly, the brominated arylidene ketones of this invention meet the requirement of hydrolytic stability which is entirely unexpected since the bromine atoms of this type compound are usually labile. That is, the bromine atoms are on carbon atoms in an alpha-position to known activating groups, viz. an aromatic ring or a carbonyl group and, consequently, would be excepted to be unstable and hydrolyze readily.

In fact, the brominated arylidene ketone self-extinguishing agents useful in the invention are remarkably hydrolytically stable under the conditions for polymer impregnation. The reason postulated for this unexpected stability is that the bromine atoms of the brominated arylidene ketones are located in the molecule such that it is sterically difficult for a water molecule to hydrolyze a bromine atom. It is not intended, of course, that the invention be limited by the postulation, but this hypothesis appears to be substantiated by molecular models of the compounds embraced in the invention.

Generally, the self-extinguishing agents can be incorporated into the polymers by any known technique including add the self-extinguishing agent to a polymer melt and by mixing in conventional blending equipment and then extruding the melt into self-extinguishing polymer pellets which are in a convenient form for molding.

The self-extinguishing agents of the invention are incorporated into the solid organic polymers in an effective amount sufficient to render the polymer self-extinguishing, generally, in amounts of from about 0.1 to 15% by weight, based on polymer. Amounts of about 1.0% or more by weight of polymer of the self-extinguishing agents are required where the self-extinguishing agent is utilized by itself. Where organic peroxide synergists such as dicumylperoxide, 2,5-dimethyl-2,5-di(t-butylperoxy)hexyne-3, di-t-butyl peroxide, and so forth are used in preparing the self-extinguishing compositions, then amounts as small as about 0.1% self-extinguishing agent can be employed. Surprisingly, in many cases the self-extinguishing compounds useful in the invention are effective in low concentrations without the aid of a peroxide synergist.

The invention is further illustrated by the following examples wherein parts are parts by weight unless otherwise indicated.

Example I

To prepare dibenzalacetone, a procedure described in Organic Synthesis, Coll. vol. II, p. 167, was employed. This procedure involved condensing benzaldehyde with acetone in an aqueous ethanol solution in the presence of sodium hydroxide. A solution was prepared containing 100 grams sodium hydroxide, 1 liter of water, and 0.8 liter of 95% ethanol. To the solution with vigorous stirring at 20–25° C. was added a mixture of 53 grams benzaldehyde and 14.5 grams acetone. Within two or three minutes after the addition of the benzaldehyde-acetone mixture, the product began to precipitate from the caustic solution. After 15 minutes, a second portion of 53 grams of benzaldehyde and 14.5 grams of acetone was added. Stirring was continued for 30 minutes. The precipitated reaction product was filtered by suction and thoroughly washed with cold water. One hundred and six grams of dry product (yield 91%) was obtained which had a melting point of 105–110° C. The product was recrystallized from ethyl acetate giving a yield from crude material of 82.5% having a melting point of 111–112° C. of dibenzalacetone (1,5-diphenyl-3-pentanone).

A 47.0 gram portion of the product, dibenzalacetone, was dissolved with stirring in 500 ml. of chloroform, and the solution cooled to a temperature of −15° C. To the stirred solution at −10 to 15° C. was gradually added over a period of 60 minutes 64 grams of bromine dissolved in 200 ml. CHCl₃. The mixture was allowed to stir and warm to room temperature in one hour. During that time, the product precipitated from solution. The product was recovered by evaporation of the chloroform in a current of nitrogen at a temperature of not exceeding 60° C. with the final removal of solvent being carried out under vacuum at 60° C. The weight of dry solids was 111 grams (yield 100%). The product, 1,5-diphenyl-1,2,4,5-tetrabromo-3-pentanone (dibenzalacetone tetrabromide), was an almost white solid which melted at 190–195° C. with decomposition. The bromine content upon analysis of the product was 56.3% (theoretically 57.8%). The crude product was recrystallized from benzene to yield a purified dibenzalacetone tetrabromide having M.P. of 207–208° C. with decomposition and a bromine content of 57.4%. The purified product had remarkable hydrolytic stability, showing only 0.7% bromine content hydrolysis after boiling in water with a dispersing agent for three hours.

Example II

This example demonstrates the self-extinguishing characteristics of expandable polystyrene prepared containing the dibenzalacetone tetrabromide prepared in Example I. To each of a series of crown-capped bottles was charged 100 grams water, 100 grams polystyrene beads previously prepared by suspension polymerization of styrene monomer, 2.0 grams calcium aluminum silicate suspending agent, 0.05 gram sodium dodecylbenzenesulfonate, 7.6 grams n-pentane, and the amount of dibenzalacetone tetrabromide indicated in Table I, below (S.E. Agent, pts.). The bottles were sealed and the contents were heated to 115° C. and held at that temperature for 6 hours with constant agitation to maintain suspension of the beads in the aqueous system. After cooling the suspension, the beads containing the self-extinguishing (S.E.) agent of Example I were recovered by filtration and washed with water. The recovered beads were then air dried.

The expandable beads were then pre-expanded to a bulk density of 1.0–2.5 pounds per cubic foot and aged for about 12 hours. The pre-expanded product containing the dibenzalacetone tetrabromide was then molded to form a foam block 5″ x 5″ x ½″ having the density shown in Table I. A specimen 1″ x 5″ x ½″ was then hung lengthwise from a clamp over a microburner having a ¾″ yellow flame. The flame was positioned ¾″ from the bottom edge of the foam sample for 3 seconds. The self-extinguishing properties of each of five samples is shown in Table I (S.E. Vertical Burn, sec.) and represents the time from withdrawal of the flame to flame-out of the foam, i.e. it represents the length of time the test sample burned in the absence of the applied flame.

TABLE I

| Expt. No. | S. E. agent, pts. | Synergist, pts.[1] | Foam density, p.c.f. | S.E. vertical burn, sec. |
|---|---|---|---|---|
| II-1 | Dibenzalacetone tetrabromide, 2.5 | 0.35 | 1.9 | 1, ½, ½, ½, ½ |
| II-2 | Dibenzalacetone tetrabromide, 4.0 | 0.35 | 2.0 | ½, ½, ½, ½, ½ |
| II-3 | Dibenzalacetone tetrabromide, 1.0 | 0.50 | 1.6 | ½, 1, ½, ½, 1 |
| II-4 | Dibenzalacetone tetrabromide, 0.75 | 0.50 | 2.1 | ½, 2, 1, 1, ½ |
| II-5 | Dibenzalacetone tetrabromide, 0.50 | 0.50 | 1.6 | 2, 2, 1, 2, 3 |
| II-6 | Dibenzalacetone tetrabromide, 1.5 | 0.0 | 1.8 | 5, 5, 3, 3, 4 |
| II-7 | Dibenzalacetone tetrabromide, 4.0 | 0.0 | 1.9 | 1, ½, ½, 1 |
| II-8 | None | 0.0 | | (²) |

[1] Synergist employed was 2,5-dimethyl-2,5-di(t-butylperoxy)hexyne-3.
[2] Burned completely.

Example III

The dibromide of benzalpinacolone was prepared utilizing the following two-step procedure. In the first step, benzalpinacolone was prepared using the process described in Organic Synthesis, Coll. vol. I, p. 81.

A solution of 50 grams of sodium hydroxide in a mixture of 0.5 liters of water and 0.4 liters of 95% ethanol was cooled to 12° C. in a 2-liter baffled flask and 50.1 grams of pinacolone was added, all at once, with rapid mechanical stirring. A 53.1-gram portion of benzaldehyde was then added, all at once, and the reaction mixture allowed to come to room temperature (23–24° C.) over a period of one hour. Stirring was continued for an additional 4 hours and the mixture was left without stirring overnight with the flask being packed in ice. The mixture separated into 2 layers. The upper organic layer was separated from the lower aqueous phase, dissolved in ether, dried over anhydrous sodium sulfate, and then evaporated. The aqueous layer was extracted with benzene and the benzene extract washed with water until the wash was no longer alkaline to litmus, then washed with sodium bisulfite solution, and then again with water. The benzene solution was dried over anhydrous sodium sulfate and combined with the product recovered from the ether solution. The benzene was removed at atmospheric pressure and the remaining product distilled at 121–123° C. at 3 mm. Hg to give 69.8 grams (74%) of a product which solidified on cooling, the product having a melting point of 39–41° C.

The dibromide of the above product was prepared by dissolving 69.2 grams of benzalpinacolone in 0.4 liter of chloroform, cooling the solution to 15° C. in a 1-liter baffled flask and adding 58.8 grams of bromine with stirring over a period of 1.25 hours while maintaining the temperature at about 15° C. An ultraviolet lamp was placed 6 inches from the reaction vessel to facilitate the reaction. The chloroform was evaporated under vacuum leaving 126 grams (98.4%) of an off-white solid residue having a melting point of 113–118° C. The crude product was recrystallized from hot ethanol to yield benzalpinacolone dibromide having a melting point of 123–125° C.

Example IV

The benzalpinacolone dibromide prepared in Example III was evaluated as a self-extinguishing agent for expandable polystyrene in the manner of Example II. The results of the experiments are shown in Table II following.

TABLE II

| Expt. No. | S.E. agent, pts. | Synergist,[1] pts. | Dens., p.c.f. | S.E. vertical burn, sec. |
|---|---|---|---|---|
| IV-1 | Benzalpinacolone dibromide, 4.0 | 0.3 | 1.8 | ½, ½, ½, ½, ½ |
| IV-2 | Benzalpinacolone dibromide, 3.0 | 0.3 | 1.8 | ½, ½, 1, ½, 1 |
| IV-3 | Benzalpinacolone dibromide, 1.0 | 0.3 | 1.8 | ½, 1, 1, 1, ½ |
| IV-4 | Benzalpinacolone dibromide, 0.5 | 0.3 | 2.0 | 2½, 2, 1, 1, 1 |
| IV-5 | Benzalpinacolone dibromide, 4.0 | 0.0 | 1.4 | 1½, 2, 2, 2, 2 |
| IV-6 | None | 0.0 | | ([2]) |

[1] Synergist employed was 2,5-dimethyl-2,5-di(t-butylperoxy)hexyne-3.
[2] Burned completely.

Example V

Benzalacetophenone dibromide was prepared by the following procedure. To a 1-liter flask equipped with a stirrer and thermometer and containing a solution of 44 grams of sodium hydroxide in 400 grams of water at 30–35° C. was charged 200 grams of isoproponal. The stirred solution was cooled to 26° C. and there was added thereto 103.2 grams of acetophenone, followed by 91.2 grams of benzaldehyde at 24–26° C. The mixture was stirred for 2 hours at 25° C. and after the commencement of crystal formation, the mixture was stirred for an additional 45 minutes at 25° C. and then cooled to 5° C. The crystals were recovered by filtration using a vacuum funnel, and the crystals were washed with water until the washings were neutral to litmus paper. The crystals were then rinsed with 40 ml. of isopropanol which had been cooled to 5° C. and vacuum dried. The yield of benzalacetophenone was 152.9 grams (85.5% yield) having a melting point of 55.5–56.5° C.

A 52-gram portion of the benzalacetophenone was dissolved in 360 ml. of chloroform at room temperature and cooled to 15° C. A 41.2-gram portion of bromine was added to the mixture over 25 minutes with stirring at a temperature of 10–15° C. A sun lamp located 6 inches from the vessel was used to facilitate the reaction. After the addition was completed, the mixture was sitrred for an additional 30 minutes, the temperature in that time being lowered to 8° C. The product was recovered by filtering the cold solution. The reaction vessel was rinsed twice with 25 ml. of chloroform which had been cooled to 5° C. The solids were then washed on the filter with two 50-ml. portions of isopropanol heated to a temperature of 70° C. The yield was 74 grams of benzalacetophenone dibromide (80% yield) having a melting point of 160.0–162.0° C.

Example VI

The product, benzalacetophenone dibromide, of Example V was evaluated as a self-extinguishing agent in expandable polystyrene in a manner similar to that of Example II. The results of the experiments are shown in Table III.

TABLE III

| Expt. No. | S.E. agent, pts. | Synergist,[1] pts. | Dens., p.c.f. | S.E. vertical burn, sec. |
|---|---|---|---|---|
| VI-1 | Benzalacetophenone dibromide, 1.25 | 0.30 | 1.5 | 1, 1, 1, 1, ½ |
| VI-2 | Benzalacetophenone dibromide, 1.50 | 0.30 | 2.4 | ½, 1, ½, ½, ½ |
| VI-3 | Benzalacetophenone dibromide, 2.0 | 0.30 | 1.8 | 1, 1, 1, 1, 1 |
| VI-4 | Benzalacetophenone dibromide, 4.0 | 0.0 | 2.4 | 1, 1, 2, 1, 2 |
| VI-5 | None | 0.0 | 2.1 | ([2]) |

[1] Synergist employed was 2,5-dimethyl-2,5-di(t-butylperoxy)hexyne-3.
[2] Burned completely.

Example VII

The dibromide of benzalacetonaphthone was prepared in two steps as follows: To a 1-liter flask equipped with stirrer and thermometer and containing 20.3 grams NaOH, 182 ml. H$_2$O, and 189 ml. ethanol at 15° C. was charged 68.1 grams β-acetonaphthone and 42.5 grams benzaldehyde. The mixture was stirred for about 4.5 hours at 20–25° C., cooled to 5° C., and filtered. The product was washed to neutral with water and vacuum dried. The yield was 99.2 grams of benzalacetonaphthone having a melting point of 102–103° C.

To a stirred solution of 64.5 grams of the benzalacetonaphthone dissolved in 300 ml. chloroform at 15–18° C. was added 40 grams bromine over a period of 45 minutes. The reaction mixture was stirred for an additional 30 minutes, cooled to 5° C., and filtered. The white-solid product was rinsed on the filter with a few milliliters of fresh chloroform and then vacuum dried. The yield of dried product was 70 grams melted at 171–172° C.

Example VIII

Cinnamalacetophenone tetrabromide was prepared in the following manner: To a 1-liter flask equipped with thermometer and stirrer containing 125 ml. ethanol, 195 ml. water, and 21.5 grams NaOH was charged 56.8 grams cinnamaldehyde and 51.7 grams acetophenone with vigorous stirring. The reaction mixture was stirred at 20–25° C. under a N$_2$ blanket. After about 1.5 hours, crystals began to form, and after 5 hours, the mixture was filtered and the filter cake washed with water and then cold ethanol. Ninety-six grams of product (95.5% theory), M.P. 85–95° C. were obtained which, upon recrystallization from ethanol, yielded 71.5 grams of cinnamalacetophenone having a melting point of 100–101° C. The recrystallized cinnamalacetophenone was brominated in the manner of Example I to yield cinnamalacetophenone tetrabromide having an M.P. 167.5–168.5° C. The structure of the product was verified by infra-red and nuclear-magnetic resonance analysis.

Example IX

Dicinnamalacetone octabromide was prepared as follows: To a 1-liter flask equipped with thermometer and stirrer containing 300 ml. CHCl$_3$ was charged 28.6 grams dicinnamalacetone. The mixture was stirred to solution. Then at 15–20° C. over a period of 55 minutes under ultraviolet light there was added 32 grams bromine, followed by a second addition of 32 grams bromine at 25–30° C. over 65 minutes. The resulting solution was stirred at room temperature for two days, after which the solvent was evaporated leaving 90.8 grams residue. The residue was digested with hot ethanol (46.1 grams insolubles) then leached with hot ether to yield 24.9 grams of dicinnamalacetone octabromide, M.P. 191–192° C.

Example X

The products of Examples I, VII, VIII, and IX were evaluated as self-extinguishing agents for an expandable copolymer of styrene and acrylonitrile having a styrene content of 71% by weight in the following manner: to a series of 3″ x 3″ polyethylene dishes of 2.5 inch depth were charged 5 grams of expanded particles of copolymer, the bromine compound, the peroxide synergist (as a 2.5% solution in n-pentane) and sufficient methyl chloride to dissolve the polymer. This mixture was agitated until uniform and the solvents were allowed to evaporate from the dishes. The residue (a coarse foam) was ignited and tested for self-extinguishability in the manner of Example II. The results of the self-extinguishing tests are shown in Table IV.

TABLE IV

| Expt. No. | S.E. agent, 5% | Synergist,[1] pts. | S.E. vertical burn, sec. |
|---|---|---|---|
| X-1 | Dicinnamalacetone octabromide | 0.0 | 1, 3, 2, 5, 2 |
| X-2 | do | 0.5 | 1, 3, 2, 2, 1 |
| X-3 | Cinnamalacetophenone tetrabromide | 0.0 | 1½, 1, 1½, 1½, 1 |
| X-4 | do | 0.5 | ½, 1, ½, ½, ½ |
| X-5 | Benzalacetonaphthone dibromide | 0.0 | 2, 2, 1½, 2, 1½ |
| X-6 | do | 0.5 | 1, 2, 2, 1, 1½ |
| X-7 | None | 0.0 | ([2]) |
| X-8 | Dibenzalacetone tetrabromide | 0.0 | 2, 2, 1½, 1 |
| X-9 | do | 0.5 | 1½, 2, 1½, 1, 1½ |

[1] Synergist employed was 2,5-dimethyl-2,5-di(t-butylperoxy)hexyne-3.
[2] Burned completely.

What is claimed is:

1. A self-extinguishing polyvinylaromatic composition comprising a vinyl aromatic polymer, and 0.2 to 10% by weight on said polymer of a compound having the general formula:

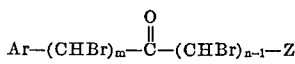

wherein Ar is phenyl, naphthyl, or tetralyl; Z is phenyl, naphthyl, tetralyl or alkyl having 4 to 20 carbon atoms; $m$ has a value of 2–4; and $n$ has a value of 1–5.

2. The composition of claim 1 wherein said vinyl aromatic polymer contains 2–20% by weight of an organic blowing agent.

3. Self-extinguishing polymer foams prepared by heating the composition of claim 2.

4. The composition of claim 1 wherein said vinyl aromatic polymer is a styrene-acrylonitrile copolymer containing a minor amount of acrylonitrile.

5. The composition of claim 1 wherein said composition contains from about 0.1–2% by weight based on said polymer of an organic peroxide synergist.

6. The composition of claim 5 wherein said vinyl aromatic polymer is a styrene-acrylonitrile copolymer containing a minor amount of acrylonitrile.

7. A self-extinguishing polystyrene composition comprising from about 0.1–2% by weight based on polystyrene of an organic peroxide synergist and 0.2–10% by weight based on polystyrene of a compound having the general formula:

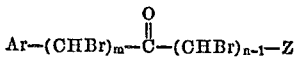

wherein Ar is phenyl, naphthyl, or tetralyl; Z is phenyl, naphthyl, tetralyl or alkyl having 4–20 carbon atoms; $m$ has a value of 2–4; and $n$ has a value of 1–5.

8. The composition of claim 7 wherein said polystyrene contains 2–20% by weight of an organic blowing agent.

9. Self-extinguishing polymer foams prepared by heating the composition of claim 8.

10. The composition of claim 8 wherein said compound is selected from dicinnamalacetone octabromide, cinnamalacetophenone tetrabromide, benzalacetonaphthone dibromide, benzalacetophenone dibromide, and dibenzalacetone tetrabromide.

References Cited
UNITED STATES PATENTS

| | | | |
|---|---|---|---|
| 2,676,927 | 4/1954 | McCurdy et al. | 260—2.5 |
| 3,058,926 | 10/1962 | Eichhorn | 260—2.5 |
| 3,331,797 | 7/1967 | Kopetz et al. | 260—28.5 |
| 3,357,942 | 12/1967 | Jackson, Jr. et al. | 260—45.7 |
| 3,359,219 | 12/1967 | Ingram et al. | 260—2.5 |
| 3,372,141 | 3/1968 | Dickerson et al. | 260—45.95 |
| 3,441,524 | 4/1969 | Burger et al. | 260—2.5 |
| 3,455,873 | 7/1969 | Jenkner | 260—45.7 |

DONALD E. CZAJA, Primary Examiner

R. A. WHITE, Assistant Examiner

U.S. Cl. X.R.

260—45.7